United States Patent
Porikli

(10) Patent No.: US 7,359,552 B2
(45) Date of Patent: Apr. 15, 2008

(54) FOREGROUND DETECTION USING INTRINSIC IMAGES

(75) Inventor: Fatih M. Porikli, Watertown, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 580 days.

(21) Appl. No.: 11/012,996

(22) Filed: Dec. 15, 2004

(65) Prior Publication Data

US 2006/0126933 A1 Jun. 15, 2006

(51) Int. Cl.
*G06K 9/46* (2006.01)
(52) U.S. Cl. ............... 382/190; 348/586; 382/164; 382/171; 382/173
(58) Field of Classification Search ............... 382/164, 382/171, 190, 224, 173; 348/586
See application file for complete search history.

(56) References Cited

U.S. PATENT DOCUMENTS

| | | | | |
|---|---|---|---|---|
| 4,698,682 | A * | 10/1987 | Astle | 348/586 |
| 6,658,136 | B1 * | 12/2003 | Brumitt | 382/103 |
| 6,731,800 | B1 * | 5/2004 | Barthel et al. | 382/176 |
| 7,024,050 | B2 * | 4/2006 | Kondo et al. | 382/254 |
| 7,139,433 | B2 * | 11/2006 | Li | 382/232 |
| 7,221,794 | B1 * | 5/2007 | Gloudemans et al. | 382/176 |
| 2003/0063802 | A1 * | 4/2003 | Li et al. | 382/199 |
| 2003/0174899 | A1 * | 9/2003 | Kondo et al. | 382/254 |
| 2003/0198382 | A1 * | 10/2003 | Chen et al. | 382/173 |
| 2004/0042680 | A1 * | 3/2004 | Saund | 382/274 |
| 2004/0057613 | A1 * | 3/2004 | Noto et al. | 382/154 |
| 2004/0062450 | A1 * | 4/2004 | Kondo et al. | 382/266 |
| 2006/0126933 | A1 * | 6/2006 | Porikli | 382/173 |
| 2006/0290780 | A1 * | 12/2006 | Porikli | 348/129 |
| 2007/0076982 | A1 * | 4/2007 | Petrescu | 382/294 |
| 2007/0147690 | A1 * | 6/2007 | Ishiwata | 382/232 |

FOREIGN PATENT DOCUMENTS

EP 1113388 A1 7/2001

OTHER PUBLICATIONS

H.G. Barrow and J.M. Tenenbaum, "Recovering Intrinsic scene characteristics from images," In Computer Vision Systems, Academic Press, pp. 3-26, 1978.
A. Elgammal, D. Harwood, and L. Davis, "Non-parametric model for background subtraction," In Proceedings of European Conference on Computer Vision, pp. II:751-767, 2000.
G.D. Finlayson, S.D. Hordley, and M.S. Drew, "Removing Shadows from Images," In Proceedings of European Conference on Computer Vision, vol. 4, pp. 823-836, 2002.

(Continued)

*Primary Examiner*—Gregory M Desire
(74) *Attorney, Agent, or Firm*—Dirk Brinkman; Clifton D. Mueller; Gene V. VinoUur

(57) ABSTRACT

A temporal sequence of images is acquired of a dynamic scene. Spatial gradients are determined using filters. By taking advantage of the sparseness of outputs of the filters, an intrinsic background image is generated as median filtered gradients. The intrinsic background image is then divided into the original sequence of images to yield intrinsic foreground images. The intrinsic foreground images can be thresholded to obtain a detection mask.

9 Claims, 6 Drawing Sheets

OTHER PUBLICATIONS

C. Stauffer and W. Grimson, "Adaptive background mixture models for real-time tracing," In Proceedings of IEEE International Conference on Computer Vision and Pattern Recognition, 1999.

O. Javed, K. Shafique, and M. Shah, "A hierarchical approach to robust background subtraction using color and gradient information," In MVC, pp. 2227, 2002.

J. Huang, and D. Mumford, "Statistics of natural images and models," In Proceedings of IEEE International Conference on Computer Vision and Pattern Recognition, pp. 541-547, 1999.

D. Koller, K. Danilidis, and H. Nagel, "Model-based object tracking in monocular image sequences of road traffic scenes," In International Journal of Computer Vision, vol. 10, 99.257-281, 1993.

Y. Matsushita, K. Nishino, K. Ikeuchi, and S. Masao, "Illumination normalization with time-dependent intrinsic images for video surveillance," In Proceedings of IEEE International Conference on Computer Vision and Pattern Recognition, 2004.

A. Mittal and N. Paragios, "Motion-based background subtraction using adaptive kernel density estimation," In Proceedings of International Conference on Computer Vision and Pattern Recognition, 2004.

A. Monnet, A. Mittal, N. Paragios, and V. Ramesh, "Background modeling and subtraction of dynamic scenes," In Proceedings of IEEE International Conference on Computer Vision, pp. 1305-1312, 2003.

J. Stauder, R. Mech, and J. Osterman, "Detection of moving cast shadows for object segmentation," In IEEE Transactions on Multimedia, vol. 1, No. 1, pp. 65-76, Mar. 1999.

M. Tappen, W. Freeman, E. Adelson, "Recovering Shading and Rflectance from a Single Image," In NIPS, 2002.

K. Toyama, J. Krumm, B. Brumitt, B. Meyers, "Wallflower: Principles and Practice of Background Maintenance," In Proceedings of International Conference on Computer Vision, pp. 255-261, 1999.

Y. Weiss, "Deriving intrinsic images from image sequences," In Proceedings of IEEE International Conference on Computer Vision, pp. 68-75, Jul. 2001.

C.R. Wren, A. Azarbayejani, T.J. Darrell, and A.P. Pentland, "Pfinder: Real-time tracking of the human body," In PAMI, 19(7): 780-785, Jul. 1997.

J. Zhong and S. Sclaroff, "Segmenting foreground objects from a dynamic, textured background via a robust kalman filter," In Proceedings of IEEE International Conference on Computer Vision, pp. 4450, 2003.

J. Yuan and Z.Shi "A New Segmentation Method For Image Sequence Of Traffic Scenes." Jun. 15, 2004.

* cited by examiner

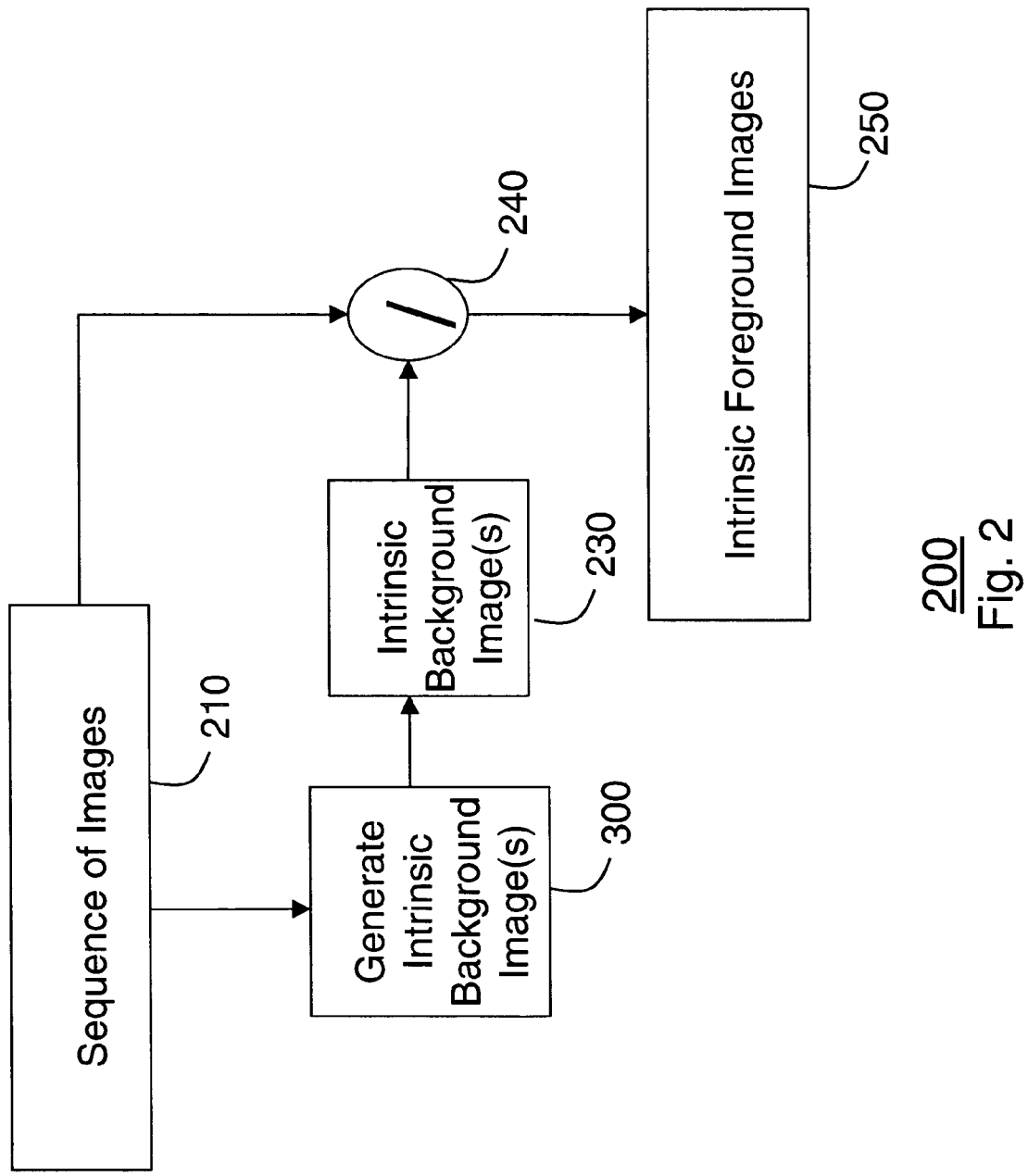

FOREGROUND DETECTION USING INTRINSIC IMAGES

FIELD OF THE INVENTION

This invention relates generally to image processing, and more particularly to detecting foregrounds in a sequence of images.

BACKGROUND OF THE INVENTION

Foreground Detection

In many computer vision applications, e.g., surveillance, tracking, and recognition applications, a necessary first step is to detect foreground objects in a scene. Typically, this is done by a background subtraction method 100, as shown in FIG. 1A. A sequence of input images 110 acquired of a scene is processed 120 to generate a background image 130. The background image is then subtracted 140 from the images 110 to yield foreground images 150.

Prior art foreground detection methods either makes strict assumptions about the composition of the scene, or fail to handle abrupt illumination changes, or are computationally complex and time consuming.

Prior art foreground detection methods can generally be classified as single-layer or multi-layer. Single-layer methods develop a single dynamical model based on the past observations.

The simplest way to construct a single-layer background image is to measure a mean or variance of the pixel intensities. The intensities can be measured on a per (RGB) channel basis, to characterize color variations. Then, the intensities can be used as a threshold to detect foreground regions. However, such an averaging operation usually produces 'ghost' regions that are neither the true background nor true foreground.

One method models statistical distributions of background pixels with a Gaussian function and alpha-blending, C. R. Wren, A. Azarbayejani, T. J. Darrell, and A. P. Pentland "Pfinder: Real-time tracking of the human body," *PAMI*, 19(7), pp. 780-785, July 1997. A background image $B_t$ is updated according to a current image $I_t$ using a preset blending weight $\alpha$, such that $B_t=(1-\alpha)B_{t-1}+\alpha I_t$.

The blending weight $\alpha$ adjusts how fast the background should blend with the current image. That averaging method is very sensitive to the selection of the blending weight. Depending to the value of $\alpha$, the foreground objects can be subsumed into the background, or illumination changes are not accommodated.

An alternative 'voting' method selects intensity values based on frequency of occurrence. That 'voting' approach has advantages over averaging. It does not blur the background and allows sudden illumination changes. The major drawback for the voting approach is its computational complexity. Quantization can be applied to decrease the number of candidate values and the number of operations. However, quantization decreases the ability to separate the foreground from the background.

Kalman filters can also be used for background detection, K. Karmann, A. Brand, "Time-varying image processing and moving object recognition," *Elsevier Science Publish.*, 1990, C. Ridder, O. Munkelt, and H. Kirchner, "Adaptive background estimation and foreground detection using Kalman filtering," *Proc. ICAM*, 1995, and K. Toyama, J. Krumm, B. Brumitt, B. Meyers, "Wallflower: Principles and Practice of Background Maintenance," *Proc. of Int'l Conf. on Computer Vision*, pp. 255-261, 1999. A version of the Kalman filter that operates directly on the data subspace is described by J. Zhong and S. Sclaroff, in "Segmenting foreground objects from a dynamic, textured background via a robust Kalman filter," *Proc. of IEEE Int'l Conf. on Computer Vision*, pp. 44-50, 2003.

A similar autoregressive model acquires properties of dynamic scenes, A. Monnet, A. Mittal, N. Paragios, and V. Ramesh, "Background modeling and subtraction of dynamic scenes," *Proc. of IEEE Int'l Conf. on Computer Vision*, pp. 1305-1312, 2003.

The Kalman filter provides optimal estimates for the state of a discrete-time process that obeys a linear stochastic difference equation, e.g., the intensities of the background. The various parameters of the Kalman filter, such as a transition matrix, a process noise covariance, and a measurement noise covariance can change at each time step. By using larger covariance values, the background adapts quicker to illumination changes. However, the filter becomes more sensitive to noise and objects in the scene. Another drawback of the Kalman filter is its inability to distinguish multimodal distribution i.e., moving leaves or grass, or waves on water. The Kalman filter gives poor performance in the presence of large non-linearities.

Another method models the background in an image with a mixture of Gaussian distribution functions, C. Stauffer and W. Grimson, "Adaptive background mixture models for real-time tracking," *Proc. of IEEE Int'l Conf. on Computer Vision and Pattern Recognition*, 1999. Rather than explicitly modeling the values of all the pixels as one particular type of distribution, the background is modeled by a pixel-wise mixture of Gaussian distribution functions to support multimodal backgrounds. Based on the persistence and the variance of each Gaussian function in the mixture, the Gaussian models that correspond to background regions are determined. Pixel values that do not fit the background distributions are considered foreground, until there is a Gaussian model that includes them in the background with sufficient and consistent supporting evidence. That method includes a learning constant and a parameter that controls the proportion of the pixels that should be accounted for by the background. The mixture-of-Gaussians method is the basis for a large number of related methods, O. Javed, K. Shafique, and M. Shah, "A hierarchical approach to robust background subtraction using color and gradient information," *MVC*, pp. 22-27, 2002.

The mixture methods are adaptable to illumination changes and do not cause ghost effect. Furthermore, the mixture methods can handle multimodal backgrounds. However, their performance deteriorates when the scene is dynamic and exhibits non-stationary properties in time. Another drawback of the mixture model based solutions is the computational load of constructing and updating the background models. For a large number of models in the mixture, such methods become computationally too demanding to be practical.

A non-parametric method uses Gaussian kernels for modeling the density at a particular pixel, A. Elgammal, D. Harwood, and L. Davis, "Non-parametric model for background subtraction," *Proc. of European Conf. on Computer Vision*, pp. II:751767, 2000.

Another method integrates optical flow in the modeling of the dynamic characteristics, A. Mittal and N. Paragios, "Motion-Based background subtraction using adaptive kernel density estimation," *Proc. Int'l Conf. on Computer Vision and Pattern Recognition*, 2004.

Statistical methods can use color, global and dynamic features to enhance object detection features, C. Jiang and M. O. Ward, "Shadow identification", *Proc. of IEEE Int'l Conf. on Computer Vision and Pattern Recognition*, pp. 606-612, 1992, and Stauder, R. Mech, and J. Ostermann, "Detection of moving cast shadows for object segmentation", *IEEE Transactions on Multimedia*, vol. 1, no. 1, pp. 65-76, March 1999.

Therefore, it is desired to improve over prior art foreground detection methods.

Intrinsic Images

One interpretation of a scene states that every image is the product of characteristics of the scene. Then, an 'intrinsic' image is a decomposition of an image that reflects one of the characteristics in the scene, H. G. Barrow and J. M. Tenenbaum, "Recovering intrinsic scene characteristics from images," *Computer Vision Systems, Academic Press*, pp. 3-26, 1978.

The decomposition of input images $I_t$ of a scene into a reflectance image R and illumination images $L_t$ can be expressed as the product $$I_t = R \cdot L_t. \quad (1)$$

The reflectance image R contains the reflectance values of the scene, and the illumination images $L_t$ contain the illumination intensities. Because the illumination images $L_t$ represent the distribution of incident lighting in the scene, while the reflectance image R depict the surface reflectance properties of the scene, this representation becomes useful to analyze and manipulate the reflectance and lighting properties of the scene as acquired in the input images.

In the prior art, intrinsic images deal with spatial characteristics within a single image of a scene, such as illumination, and reflectance as visible in image texture, and not the temporal evolution of foreground objects in the scene itself.

As shown in FIG. 1B, one decomposition method estimates a maximum likelihood to produce reflectance images 102 and illumination images 103 from a sequence of input images 101 acquired from a fixed point under significant variations in lighting conditions, Y. Weiss, "Deriving intrinsic images from image sequences," Proc. of *IEEE Int'l Conf. on Computer Vision*, pp. 68-75, July, 2001. Note, that lighting from the right (R) and left (L) is clearly visible in the illumination image That method has been extended to derive varying reflectance images and corresponding illumination images from a sequence of images. Y. Matsushita, K. Nishino, K. Ikeuchi, and S. Masao, "Illumination normalization with time-dependent intrinsic images for video surveillance," *Proc. of IEEE Int'l Conf. on Computer Vision and Pattern Recognition*, 2004. Matsushita et al. also describe an illumination eigenspace, which captures the illumination variations. In that method, the scene is static, the only thing that is detected are variation of external factors of the scene, such as lighting conditions. The motion of foreground objects is not considered.

Another method recovers an illumination invariant image, which is similar to a reflectance image, from a single color image, G. D. Finlayson, S. D. Hordley and M. S. Drew, "Removing Shadows from Images," *Proc. of European Conf. on Computer Vision* Vol. 4, pp. 823-836, 2002. Finlayson et al. assume the input image contains both non-shadowed surfaces and shadows cast on those surfaces. They calculate an angle for an 'invariant direction' in a log-chromaticity space by minimizing an entropy of the color distribution.

Another method uses multiple cues to recover shading and reflectance images from a single image, M. Tappen, W. Freeman, E. Adelson, "Recovering Shading and Reflectance from a single image," NIPS, 2002 Tappen et al., use both color information and a classifier trained to recognize gray-scale patterns. Each intrinsic image is classified as being caused by shading or a change in the surfaces reflectance. Note, that method also does not consider the motion of foreground objects in a scene.

Another deterministic method uses gray levels, and local and static features, M. Kilger, "A shadow handler in a video-based real-time traffic monitoring system," *Proc. of IEEE Workshop on Applications of Computer Vision*, pp. 11-18, 1992, and D. Koller, K. Danilidis, and H. Nagel, "Model-based object tracking in monocular image sequences of road traffic scenes," *Int'l Journal of Computer Vision*, vol. 10, pp. 257-281, 1993.

In general, prior art intrinsic images do not consider motion of foreground objects in a scene. Therefore, it is desired to provide improved intrinsic images that do reflect motion variations in the scene itself.

Furthermore, it is desired to use the improved intrinsic images to improve foreground detection.

SUMMARY OF THE INVENTION

Instead of conventional foreground detection by way of background subtraction, the invention decomposes images of a dynamic scene into time-varying intrinsic background and foreground images. A product of these intrinsic images characterizes the scene.

A temporal sequence of images is acquired of the scene. Spatial gradients are determined using filters. By taking advantage of the sparseness of outputs of the filters, an intrinsic background image is generated as median filtered gradients. The intrinsic background image is then divided into the original sequence of images to yield intrinsic foreground images.

The invention also provides a robust method for thresholding intrinsic foreground images to obtain a detection mask. The invention can also detect static and moving lines.

The method is computationally efficient and effectiveness even under abrupt and severe illumination changes.

BRIEF DESCRIPTION OF THE DRAWINGS

FIG. 2 shows a method for detecting foregrounds in scenes according to the invention;

DETAILED DESCRIPTION OF THE PREFERRED EMBODIMENT

Intrinsic Background Image

Figure 1A:
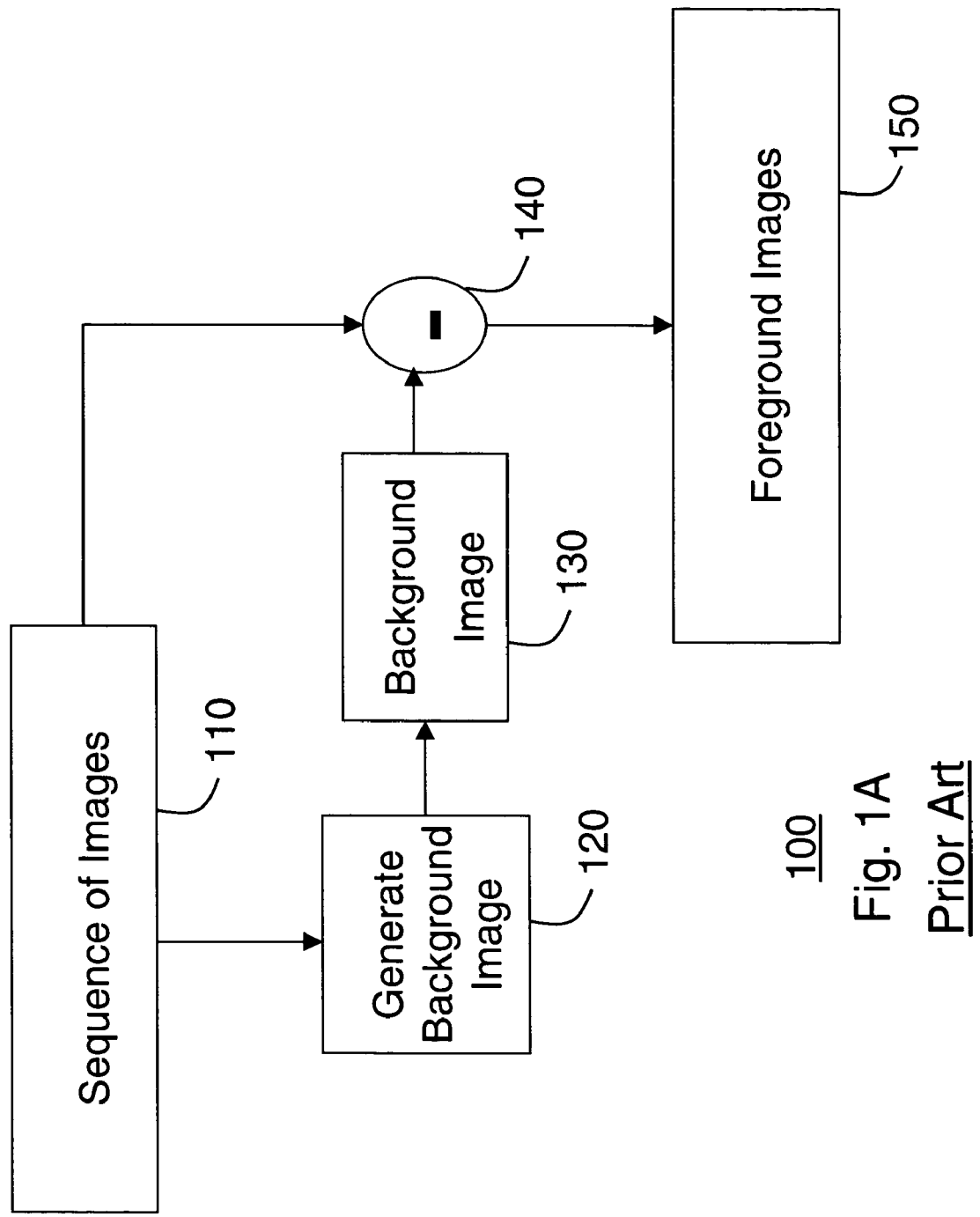
FIG. 1A shows a prior art method for detecting foregrounds in scenes.
Figure 1B:
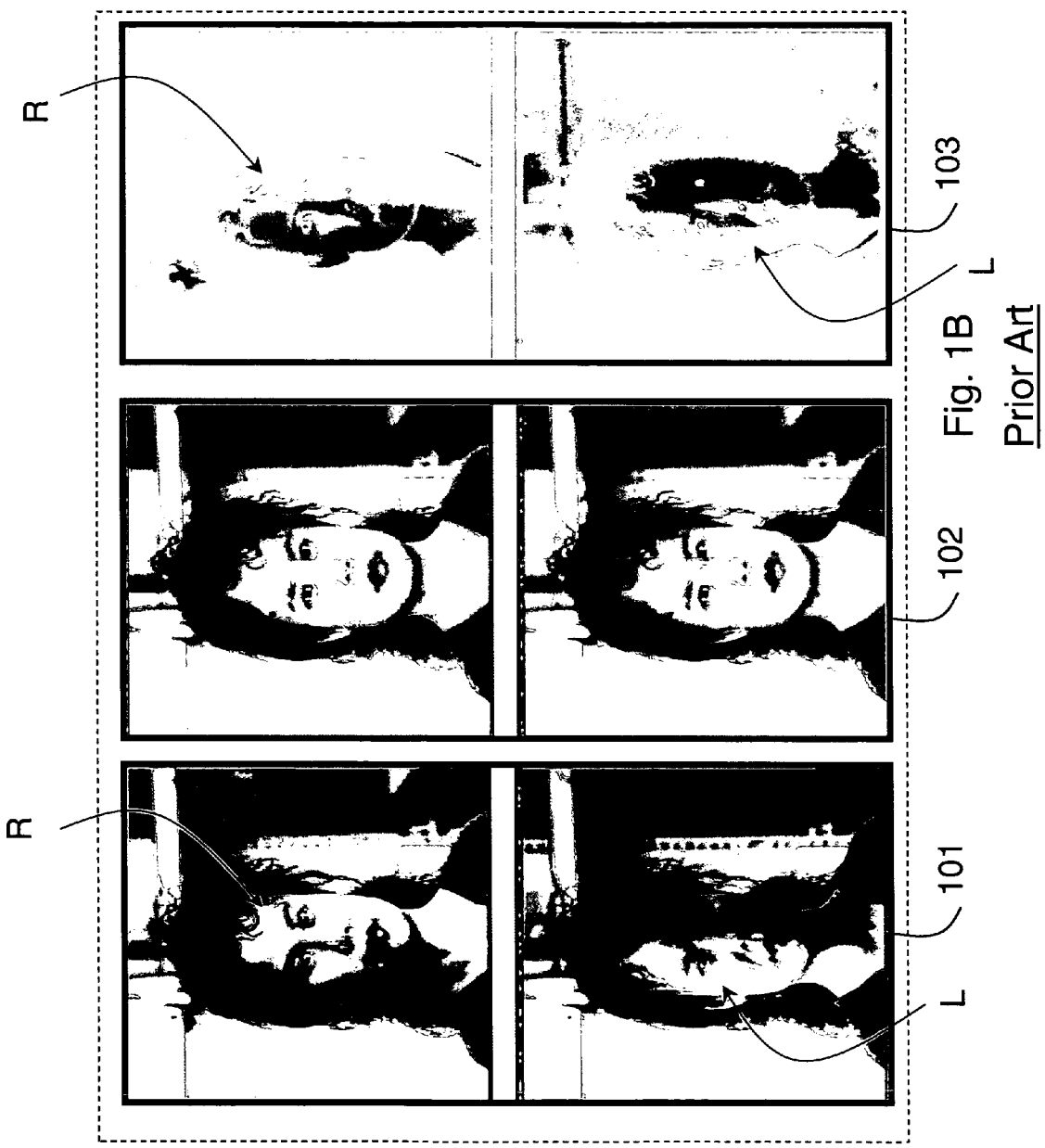
FIG. 1B shows prior art intrinsic images.

As shown in FIG. 2, the invention provides a method 200 for detecting foreground regions in images. The foreground regions typically represent moving objects in the scene. A sequence of input images 210 acquired of a scene is processed 300 to generate an intrinsic background image 230. Each of the input images 210 is divided 240 by the intrinsic background image to yield a sequence of intrinsic foreground images 250. In a preferred embodiment, the intrinsic background image is updated as each current image in the sequence 210 is processed.

The invention characterizes a scene as a product of the foreground and background characteristics, i.e., $$I_t = B \cdot F_t,  \quad (2)$$

where the background image $B_t$ 230 is relatively static, and the foreground images $F_t$ 250 characterizes dynamic characteristics of the scene, e.g., moving objects. It should be noted that the background image can vary, but over a much longer time-scale as the foreground images. Therefore, according to the invention, a division 240 of the input images by the intrinsic background image determines the intrinsic foreground images $$F_t = \frac{I_t}{B}.$$

Note that this definition is in stark contrast with the prior art, which expresses the background and foreground characteristics as an additive inference, i.e., $I_t = B + F_t$, and the foreground image is $F_t = I_t - B$.

In real-world scenes, the static and dynamic characteristics change over time, although the 'static' characteristics change substantially slower than the dynamic characteristics. For example, in a 'static' outdoor scene, the movement of building shadows is relatively slow, and in an indoor scene, a bag is eventually subsumed into the background when it is left unattended.

Therefore, the notion that a single time invariant static image can represent a background is wrong. While the time invariant background image B(x, y) reasonably describes the static scene without moving objects, the estimated foreground images F(x, y, t) tend to contain considerable amount of texture and shadows, especially if global illumination varies. Therefore, unlike the method according to Weiss, which implicitly assumes the reflectance images are time invariant of the illumination images, the invention uses time variant intrinsic images, i.e., both the background and foreground images are updated over time.

Figure 3:
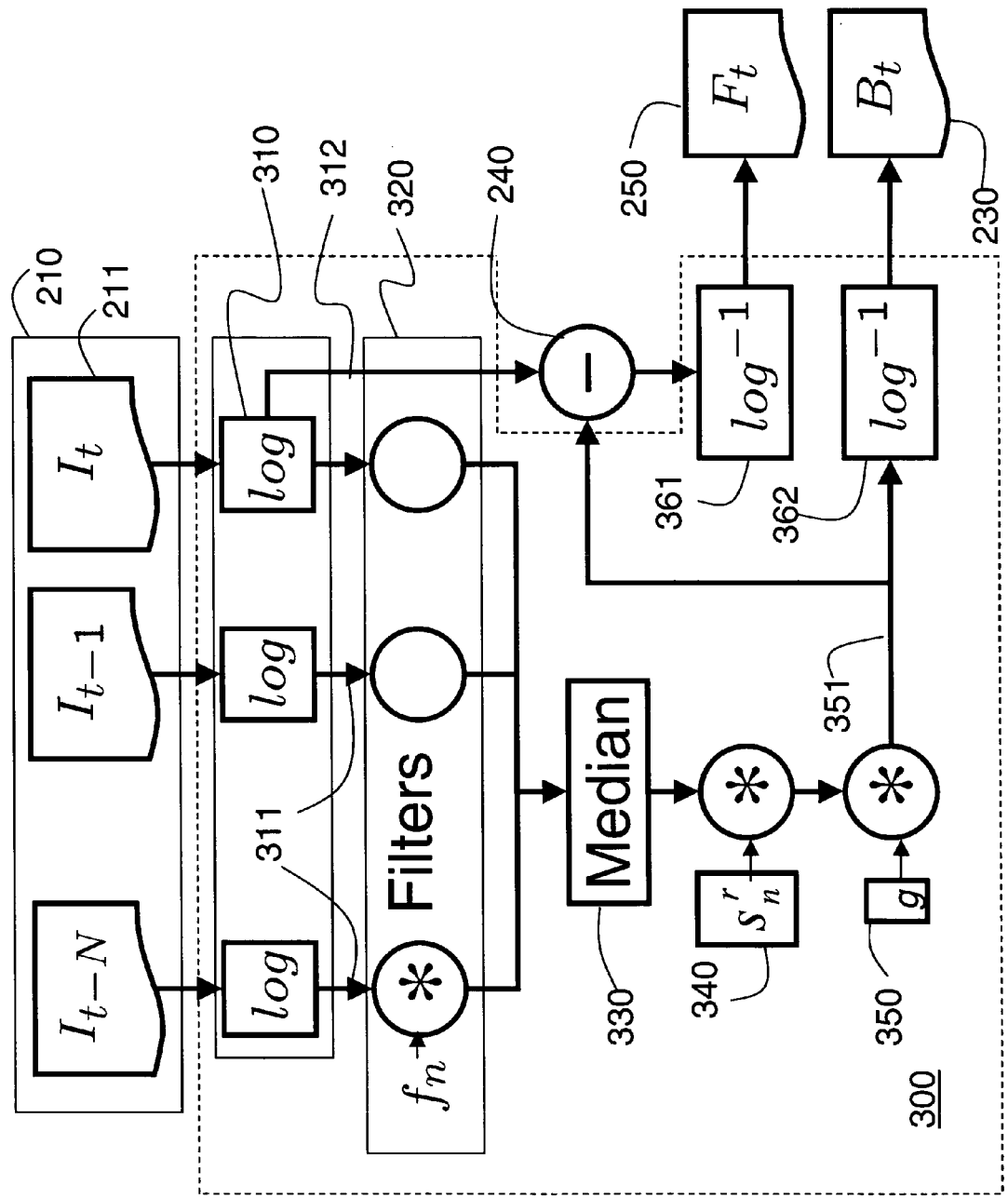
FIG. 3 shows detailed steps of the method of FIG. 2.

As shown in detail in FIG. 3, The invention acquires a sequence of N input images 210, $\{I_{t-N}, \ldots, I_{t-1}, I_t\}$, of a scene. The image 211 is a current input image. A rate at which the images are acquired can depend on a speed of moving objects in the scene. If overlap between appearances of moving objects in consecutive images is minimized, the derived statistics of the objects are less likely to contaminate the background images 230.

Therefore, a support set of images is $\{I_{t-kN}, \ldots, I_{t-k}, I_t\}$, where k is a sampling period. Although it is reasonable to select a longer sampling period, a short sampling period is used for scenes where objects move fast. In any case, the sampling period k is not a critical decision. It should also be noted that images can be acquired at varying rates dependent on an average motion in the scene, over time.

Next, determine 310 the logarithm (log) of the intensity values of each input image $I_t$ 210. This produces 'log' images 311-312, where log image 312 is for the current input image 211.

Next, spatial derivative filters $s_n$ 320 are applied to the log images $i_t$ 311-312 to determine intensity gradients according to $$s_n * i_t$$

where '*' represents a convolution. The derivative filters can be $s_0 = [1\ -1]$, $s_1 = [1\ -1]^T$.

Instead of using derivative filters, a line detector of the for $f_{line} = [-12\ -1]$ can also be used. The output of this filter is also sparse. This filter can capture static and moving edges in a scene, which is essential for the shape extraction.

Because the filter outputs are Laplacian distributed and independent over space and time, a maximum likelihood estimate of the filtered background image $\hat{b}_{tm}$ is a median image 330 given by $$\hat{b}_{tm} = \text{median}_t\{s_n * i_t\}. \quad (3)$$

Note, the median image 330 is the result of filtering over a 'window' of n previous log input images 311 and the current log input image 312. By updating for each new input image, the intrinsic background image is always correct. This is a direct result of the fact that when derivative filters 320 are applied to images of natural scenes, the outputs of the filters tend to be sparse.

The intrinsic foreground images $f_{tm}$ 250 are then determined by using estimated filtered background images $\hat{b}_{tm}$ according to $$f_{tm} = (s_n * i_t) - \hat{b}_{tm}. \quad (4)$$

The median image 330 is now 'reverse' filtered by solving a systems of linear equations $$\hat{b}_t = g * \left(\sum_n s_n^r * \hat{b}_{tm}\right), \text{ and} \quad (5)$$

$$\hat{f}_t = g * \left(\sum_n s_n^r * \hat{f}_{tm}\right), \quad (6)$$

where $s_n^r$ 340 is the reversed filter of $s_n$, and the filter g 350 is the filter which satisfies the Fourier equation $$G = (S_n \cdot S_n^r)^{-1}. \quad (7)$$

The filter g 350 is independent of the input image sequence 210, and can be predetermined.

Still in the logarithmic domain, the output 351 of the filter 350, which is the log of intrinsic background image, is then subtracted from the log of the current image 310. In the log domain this corresponds to the division 240.

The final intrinsic foreground images 250 and intrinsic background images 230 are then obtained by applying inverse logarithms 361-362 according to $B_t = e^{b_t}$, $F_t = e^{f_t}$.

A mask image $M_t$ can also used. The mask image $M_t$ represents the foreground pixels in the current input image $I_t$ based on intensity statistics of a difference between the current intrinsic background and foreground images $D_t(x, y) = B_t(x, y) - F_t(x, y)$.

The distribution of this difference can be approximated by a Gaussian function. Thus, the mean $\mu_t$ and variance $\sigma_t^2$ of the distribution are determined, and the 95% percentile is assigned as the threshold $\tau = 2.5\ \sigma$. The mask image $M_t$ is given by $$M_t(x, y) = \begin{cases} 1 & |D(x, y) - \mu_1| > 2.5\sigma_t \\ 0 & \text{otherwise} \end{cases} \quad (8)$$

Figure 4:
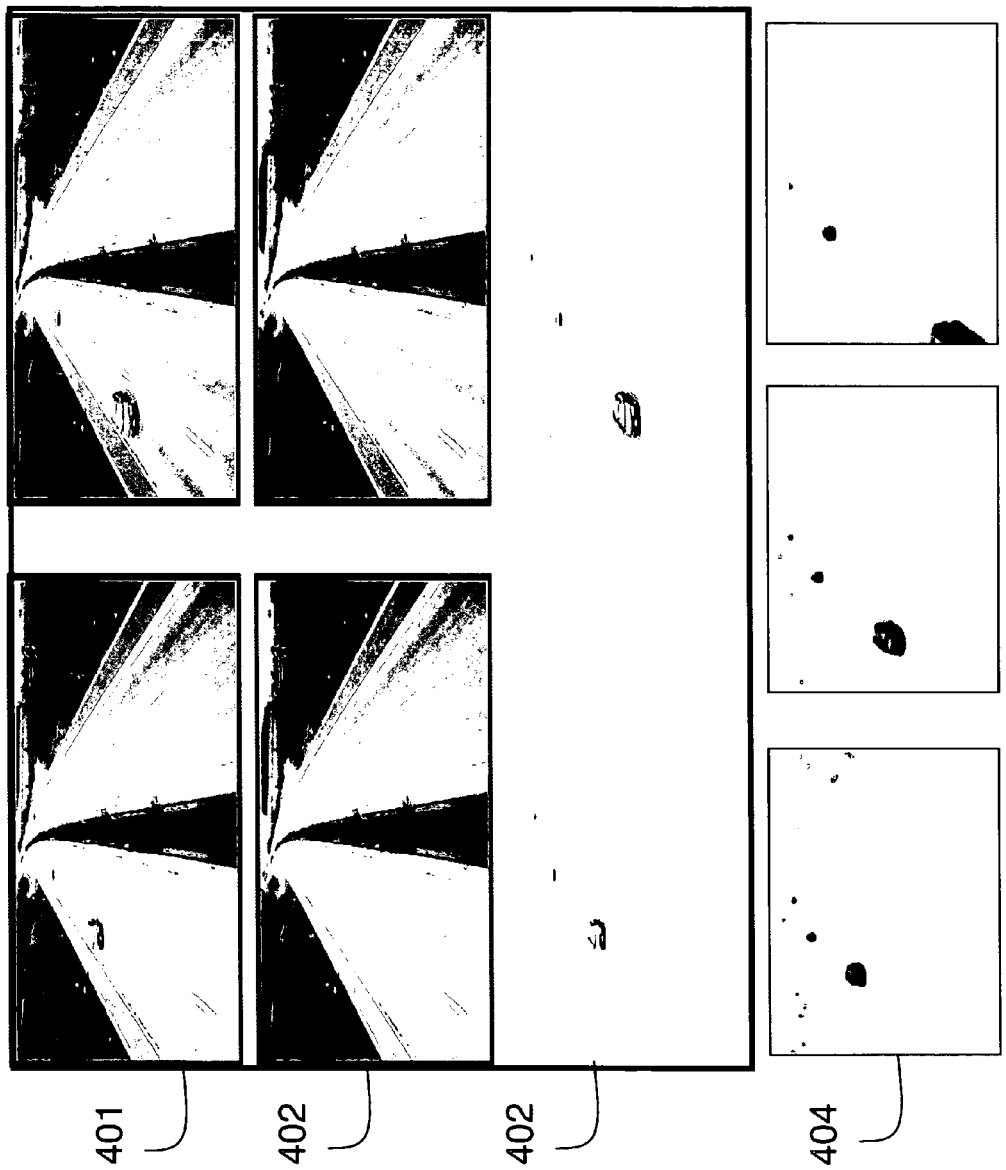
FIG. 4 shows intrinsic images if a road scene according to the invention.

For a sequence of input images 401 of a traffic scene, FIG. 4 shows corresponding intrinsic background images 402, intrinsic foreground images 403, and mask images 404, according to the invention. It is clear that the mask image tracks the moving vehicles. The scene contains moving bushes and clouds in the distance and diffuse shadows under the vehicles. Note that the foreground images 402 are accurate and do not contain these artifacts. It is also seen that the diffuse shadows are eliminated in the mask images 404.

Figure 5:
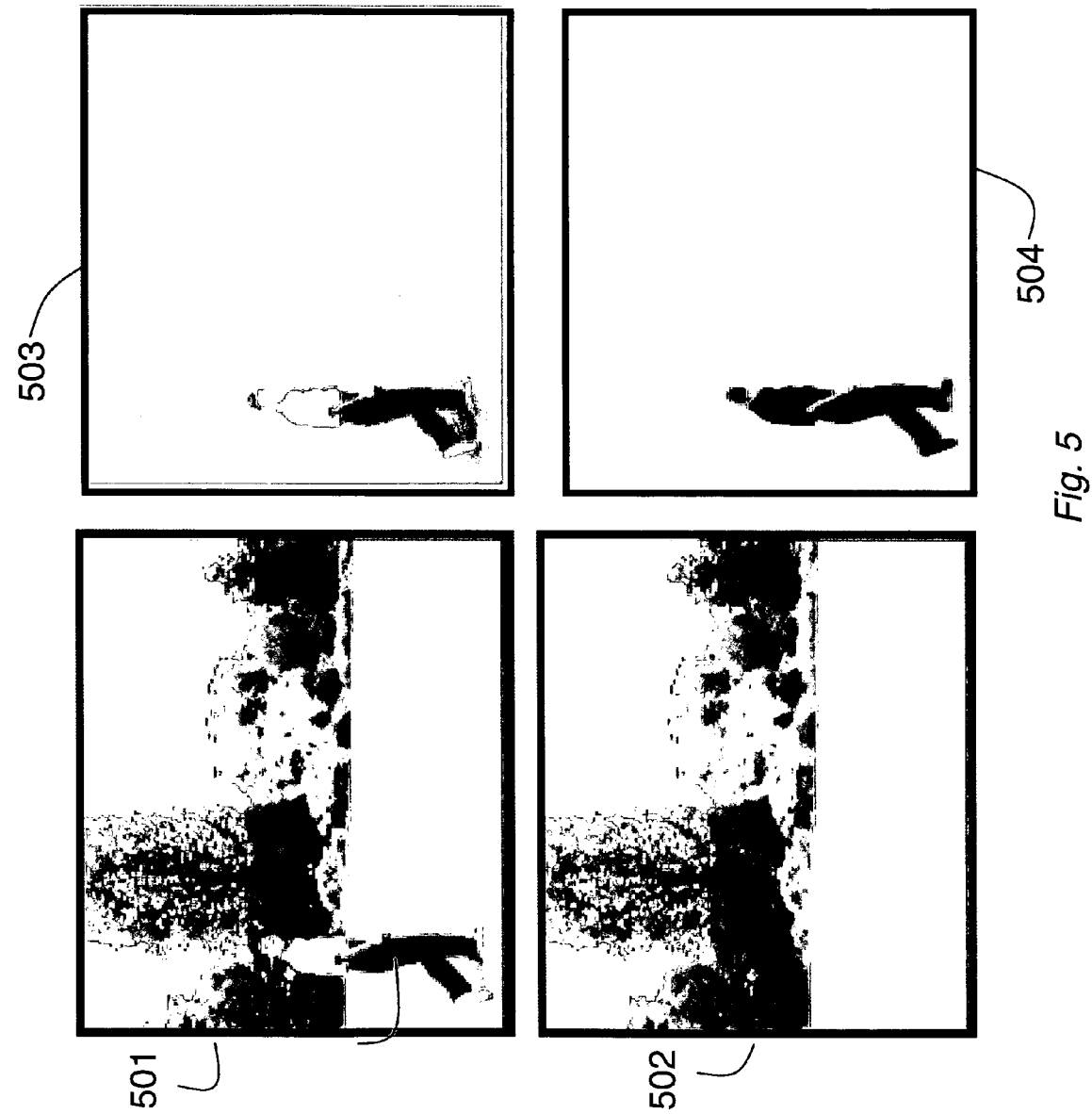
FIG. 5 shows intrinsic images if a golf scene according to the invention.

FIG. 5 shows an input image 501 of a golf scene, the corresponding intrinsic background image 502, intrinsic foreground image 503, and mask image 504. In this scene sky color changes and shadows are more eminent. The method according to the invention accurately decomposes the input image into background and foreground images.

Effect of the Invention

The invention detects foreground regions, such as moving objects from a sequence of input images acquired by a stationary camera. As opposed to the additive background/foreground scenario of the prior art, the invention decompose a sequence into a product of time-varying multiplicative intrinsic background and foregrounds images. There are several advantages of the proposed method. A product has a higher gain than a sum, and therefore the invention is less sensitive to sudden and severe illumination changes. The method is not model based, thus model fitting is not required. The method is computationally efficient and can be implement into a real-time system. The method does not require a fine-tuning of parameters. The invention can also estimate a static edge map of a scene. Most importantly, the multiplicative background/foreground characterization yields better performance than the prior art additive scenario.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for modeling background and foreground regions of a scene from a sequence of input images of the scene, comprising:

converting each input image to a logarithmic image;

applying a filter to each logarithmic image;

determining a median image from a temporal window of filtered logarithmic images;

reverse filtering the median image;

subtracting the median image from a current logarithmic image to obtain a logarithmic foreground image:

applying an inverse logarithm to the logarithmic foreground image to obtain the intrinsic foreground image, and applying the inverse logarithm to the median image to obtain an intrinsic background image; and dividing each input image by the intrinsic background image to obtain a sequence of intrinsic foreground images.

2. The method of claim 1, further comprising:

updating the intrinsic background image as each input image is processed.

3. The method of claim 1, in which a sampling period of the input images varies over time.

4. The method of claim 1, in which a sampling period of the input images varies as a function of moving objects in the scene.

5. The method of claim 1, in which the filter is a spatial derivative filters.

6. The method of claim 1, in which the filter is a line detector.

7. The method of claim 1, further comprising:

detecting moving objects in the intrinsic foreground image; and generating a mask image for the moving objects.

8. The method of claim 7, in which the mask image is based on intensity statistics of a difference between the intrinsic background image and the intrinsic foreground images.

9. The method of claim 1, further comprising:

detecting lines and silhouettes from the intrinsic background image using a line detector.

* * * * *